United States Patent
Kiron

(10) Patent No.: US 11,770,180 B1
(45) Date of Patent: Sep. 26, 2023

(54) SATELLITE COMMUNICATIONS SYSTEM

(71) Applicant: Raviv Kiron, Naperville, IL (US)

(72) Inventor: Raviv Kiron, Naperville, IL (US)

(*) Notice: Subject to any disclaimer, the term of this patent is extended or adjusted under 35 U.S.C. 154(b) by 0 days.

(21) Appl. No.: 17/863,154

(22) Filed: Jul. 12, 2022

(51) Int. Cl.
    *H04B 7/185*      (2006.01)
    *H04B 7/195*      (2006.01)

(52) U.S. Cl.
    CPC ......... *H04B 7/18515* (2013.01); *H04B 7/195* (2013.01)

(58) Field of Classification Search
    CPC ............................. H04B 7/18515; H04B 7/195
    See application file for complete search history.

(56) References Cited

U.S. PATENT DOCUMENTS

| | | | |
|---|---|---|---|
| 9,843,107 B2* | 12/2017 | Corman | H04W 72/0453 |
| 2014/0320345 A1* | 10/2014 | Caille | H01Q 3/40 |
| | | | 342/373 |
| 2021/0296778 A1* | 9/2021 | Varel | H01Q 15/0086 |
| 2021/0336689 A1* | 10/2021 | Ross | H04W 88/08 |

* cited by examiner

*Primary Examiner* — Khaled M Kassim
*Assistant Examiner* — Najeeb Ansari
(74) *Attorney, Agent, or Firm* — Clifford H. Kraft

(57) ABSTRACT

A phased array antenna system that reduces the high number of active elements and complexity. In order to achieve this reduction, the RF chain is designed for summation of all radiators in a single row. This reduces the hardware complexity from $N^2$ to $N$ where the array size is N×N. This reduction allows the antenna to electronically steer in one axis. The other axis is mechanically steered using a rotating platform. The loss between the LNA or PA with the row summation scheme is very low resulting in very high performance. Receiving and transmitting take place from the same aperture.

12 Claims, 14 Drawing Sheets

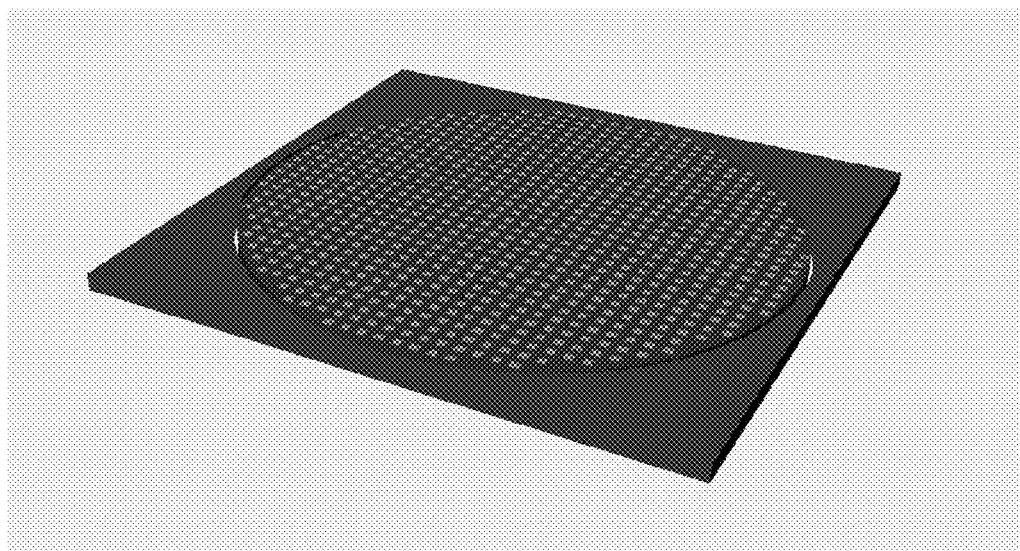
Fig. 1
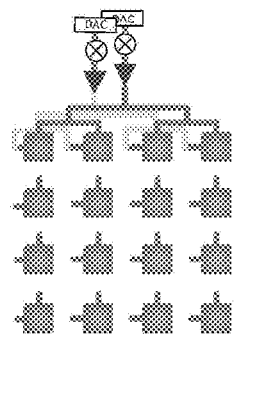 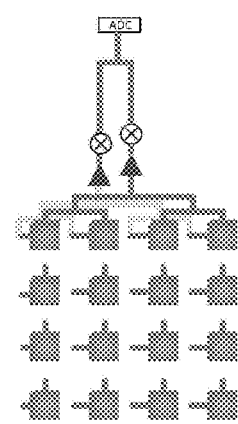
Fig 2A  Fig. 2B

SATELLITE COMMUNICATIONS SYSTEM

BACKGROUND

Field of the Invention

The present invention relates generally to the field of satellite communications antennas, and more particularly to a multi-beam, compact and high efficiency printed array antenna for both geostationary orbit (GEO) and non-GEO satellites.

Description of the Problem Solved

Radio communication with satellites is known in the art. Many different types of antennas are used to receive satellite signals (such as Global Positioning Satellites GPS) and to transmit to satellites. In some cases transmission may originate from a different antenna than receive.

Many communication satellites are in geosynchronous or geostationary orbits. A geosynchronous orbit is circular with a radius of 42,164 km. The satellite orbits the earth in a sidereal day (23 hours, 56 minutes and 4 seconds), and stays approximately over a fixed longitude in the sky (but may drift north and south based on inclination of the orbit with respect to the earth's equatorial plane). The geosynchronous satellite appears in the same place in the sky once every sidereal day. A geostationary orbit (GEO) is a geosynchronous circular orbit at an altitude above the earth of 35,786 km with zero inclination to the equatorial plane and also has a period of one sidereal day. The GEO satellite travels west to east and remains at a stationary point in the sky as observed from a particular location.

However, the current trend is to move to Non-GEO satellites (NGSO). It is estimated that around 100,000 NGSO satellites will be deployed by the year 2030. These satellites have significantly lower launch and operational costs, extremely high capacity and hundreds of Mbps per user data rates. They will be used for connected vehicles such as cars, airplanes, ships, drones and military operations with, in one example, inflight connectivey in aircraft. One particular type of NGSO satellite envisioned for these applications is a Low Earth Orbit (LEO) satellite. Having much lower altitudes than that of GEO satellites, LEO satellites will appear in constellations or networks where satellites rise above the horizon (sunrising satellite), move across the sky and disappear below the horizon (sunsetting satellite). In such constellations, there will always be at least one (and probably more than one) satellite visible at any given time. Antennas that allow tracking and communication with NGSO satellites such as LEO satellites will generally be phased-array antennas, since a non-synchronous satellite will move across the sky and may only be able in a communications window for minutes. With the advent of higher frequency electronic technology, and assembly techniques for smaller and smaller layouts, smaller antennas have become more and more common. It is envisioned that communication with NGSO satellites will gradually move to higher and higher frequencies. In the near future, Ku band (12-18 GHz) will be used. However, there will be moves to even higher frequencies (and hence smaller or more complex antennas) such as Ka band (25-40 GHz) and even possibly V band (40-75 GHz).

A typical prior art phased array antenna is constructed as an array of patches or waveguides. Such antennas for the NGSO application will need high Equivalent Isotropically Radiated Power (EIRP), and high Gain to Noise Temperature (G/T). A full phased array that can steer a beam at any angle from a plane will need an enormous number of feeds and RF chains (above 500), which makes this solution expensive and inefficient in both complexity, power consumption and weight. Typical phase shifters for phased arrays are analog integrated circuits (ICs). These devices have the disadvantage of an undesired coupling between phase and amplitude. Changing phase usually results in a change in amplitude, and vice-versa. Hence a closed-loop algorithm must be used to correctly change and maintain phase and amplitude values. It would be extremely advantageous to have a phased array communication system for the NGSO satellite application that overcomes these disadvantages.

SUMMARY OF THE INVENTION

The present invention relates to a phased array antenna system that reduces the large number of active elements and complexity. In order to achieve this reduction, the RF chain is designed for summation of all radiators in a single row. This reduces the hardware complexity from $N^2$ to N, where the array size is N×N. This reduction only permits the antenna to electronically steer in one axis. The other axis is mechanically steered using mechanical rotation. The loss between the Low Noise Amplifier (LNA) in receive or the Power Amplifier (PA) in transmit using this summation scheme is very low, resulting in very high performance. Receiving and transmitting both take place from the same aperture. Phase shifting and polarization control is achieved digitally allowing a steered beam on one axis with either linear or circular polarization. An enormous advantage of the present invention is the ability to generate multi-beam in elevation. In a LEO constellation, a connection to a sunrising satellite must be obtained before a disconnection from a sunsetting satellite takes place. In a dense network, the differences between satellites in azimuth can be very small. Embodiments of the present invention operate in or near the Ku band or higher frequencies using different array sizes. Particular embodiments include array sizes of 8×8 and 32×32 elements. However, the invention is not limited to these array sizes, different square and non-square arrays are within the scope of the present invention.

DESCRIPTION OF THE FIGURES

Attention is now directed to several drawings that illustrate features of the present invention.

FIG. 1 shows an isometric view of a circular embodiment of the present invention.

FIG. 2A shows an example 4×4 feed array in a receive mode.

FIG. 2B shows an example 4×4 feed array in a transmit mode.

Figure 3:
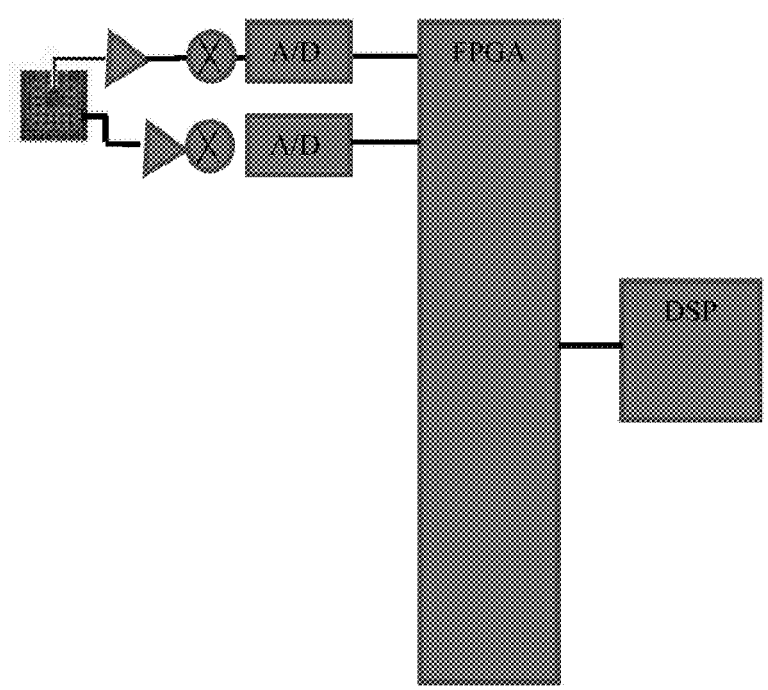
FIG. 3 is a block diagram of an array coupled through low noise amplifiers (LNAs) and mixers to an programmable gate array (FPGA) and digital signal processor (DSP) in a receive mode.

Several figures and illustrations have been provided to aid in understanding the present invention. The scope of the present invention is not limited to what is shown in the figures.

DESCRIPTION OF THE PREFERRED EMBODIMENTS

The present invention relates to a phased array antenna system that reduces the high number of active elements and complexity of a typical phased array. In order to achieve this reduction, the RF chain is designed for summation of all radiators in a single row. This allows vertical (elevation) electronic beam scanning with mechanical horizontal azmuthal tracking. This is very acceptable in the NGSO application, since high speed azmuthal changes are not typically required.

Due to the construction of the array, and the summation of all radiators in a single row, the transmission loss is very small between the array and the LNA, or PA. This supports the high performances of the antenna on one hand, while on the other, the solution of having an active RF chain per row reduces the hardware complexity from $N^2$ to N, where the array size is N×N.

A Field Programmable Gate Array (FPGA) changes the phase on each RF chain and then sums up all rows allows the antenna to electronically steer in one axis (the summation can also be done on the antenna circuit board in some embodiments). To complete the entire spatial angle, the antenna is mounted on a rotating disk which makes it feasible to mechanically steer on the other axis. FIG. 1 shows a circular array antenna embodiment of the present invention.

Other embodiments are square arrays or rectangular arrays. In order to simplify the hardware, each RF chain is down-converted and sampled by an analog-to-digital converter (ADC) for receive (Rx), and is digitally synthesized and up-converted by a digital-to-analog converter (DAC) for transmit (Tx).

In this topology the beamforming is done digitally using the FPGA, and there are no analog variable components to control the beam. The FPGA also controls polarization. As previously stated, the beam is steered electronically along one axis, and steered mechanically along the other. Typically, the electronically steered axis is altitude with azimuth being steered by mounting the array on a rotatable disk.

Controlling phase and delay in the digital domain gives an "ideal phase shifter" and "ideal true time delay shifter" mechanism. Usually in an analog architecture, the phase shifter integrated circuits (ICs) are not ideal, and when changing the phase, the amplitude is also changed and vice-versa. There is an undesirable coupling between amplitude and phase. Typically, a closed-loop control must be used in order to measure and correct the phase and amplitude values. The present invention avoids the necessity for this closed-loop.

The antennas used in the present invention have both horizontal and vertical radiators and feeds. This allows linear polarization and circular polarization. The antenna of the present invention includes both horizontal and vertical feeds. This allows both polarizations which are required for the application. It is required to have dual hardware for the vertical and horizontal feeds, with the polarization being set according to weight balance achieved by digital attenuators that give the correct power weight to the vertical arm and the horizontal arm respectively for linear polarizations, and phase shifters that provide 90 degrees of phase difference between and the vertical and horizontal arms for circular polarization. All this is done on a row basis to maintain the low overall hardware complexity.

Figure 4:
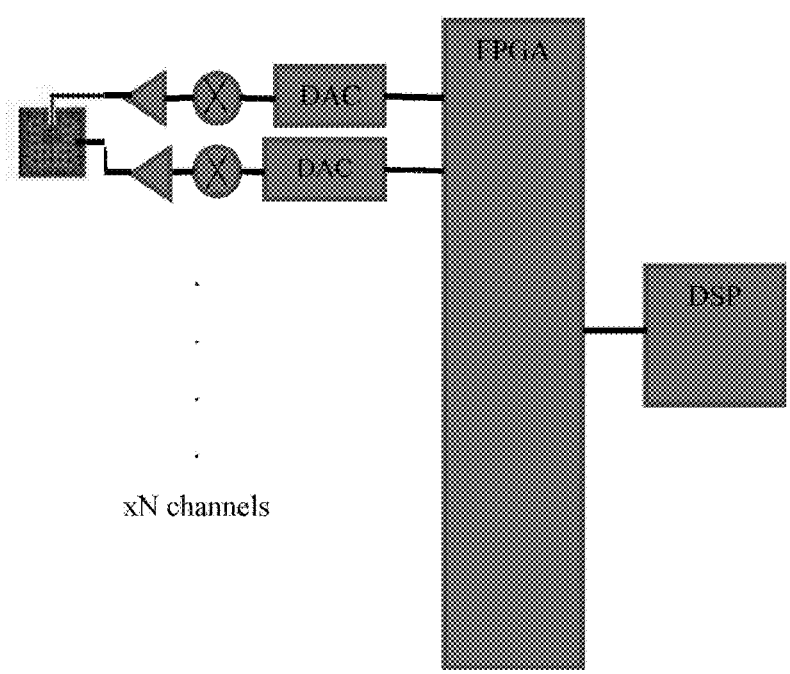
FIG. 4 is a block diagram of a DSP coupled through an FPGA mixers and power amplifiers (PAs) to an array in a transmit mode.

FIG. 2A shows row summation on a 4×4 array for receive, and FIG. 2B shows row summation on a 4×4 array for transmit. These small arrays are presented for example only; typically arrays for the application run from 8×8 to 32×32 or larger. FIG. 3 shows a system diagram in the receive mode. The array rows and columns drive LNAs into mixers which down-convert. The down-converted signals are sampled by A/D converters and fed into an FPGA for beam forming using digital phase shifters and amplitude control. The output of the FPGA is a digital data signal that enters a DSP for higher level communication processing. The DSP also controls the beam forming process. FIG. 4 shows a digital signal data signal leaving the DSP as well as beam forming information to the FPGA. The FPGA sets the phase of the signal which are converted to analog and up-converted to the output frequency. The up-converters drive power amplifiers (PAs) which in turn drive the array.

Major advantages of the system of the present invention is maintaining continuous linear polarization, with the ability to switch between horizontal and vertical polarization, as well as circular polarization with the ability to switch between right hand or left hand circular polarization. Linear polarization is controlled by adjusting the power balance between the vertical and horizontal arms of the antenna active elements, while circular polarization is achieved by creating a +90 degree or −90 degree phase shift between the horizontal and the vertical arms while keeping the amplitude equal. The system can switch to each one of the combinations automatically by digital command from a Digital Signal Processor (DSP).

Figure 5:
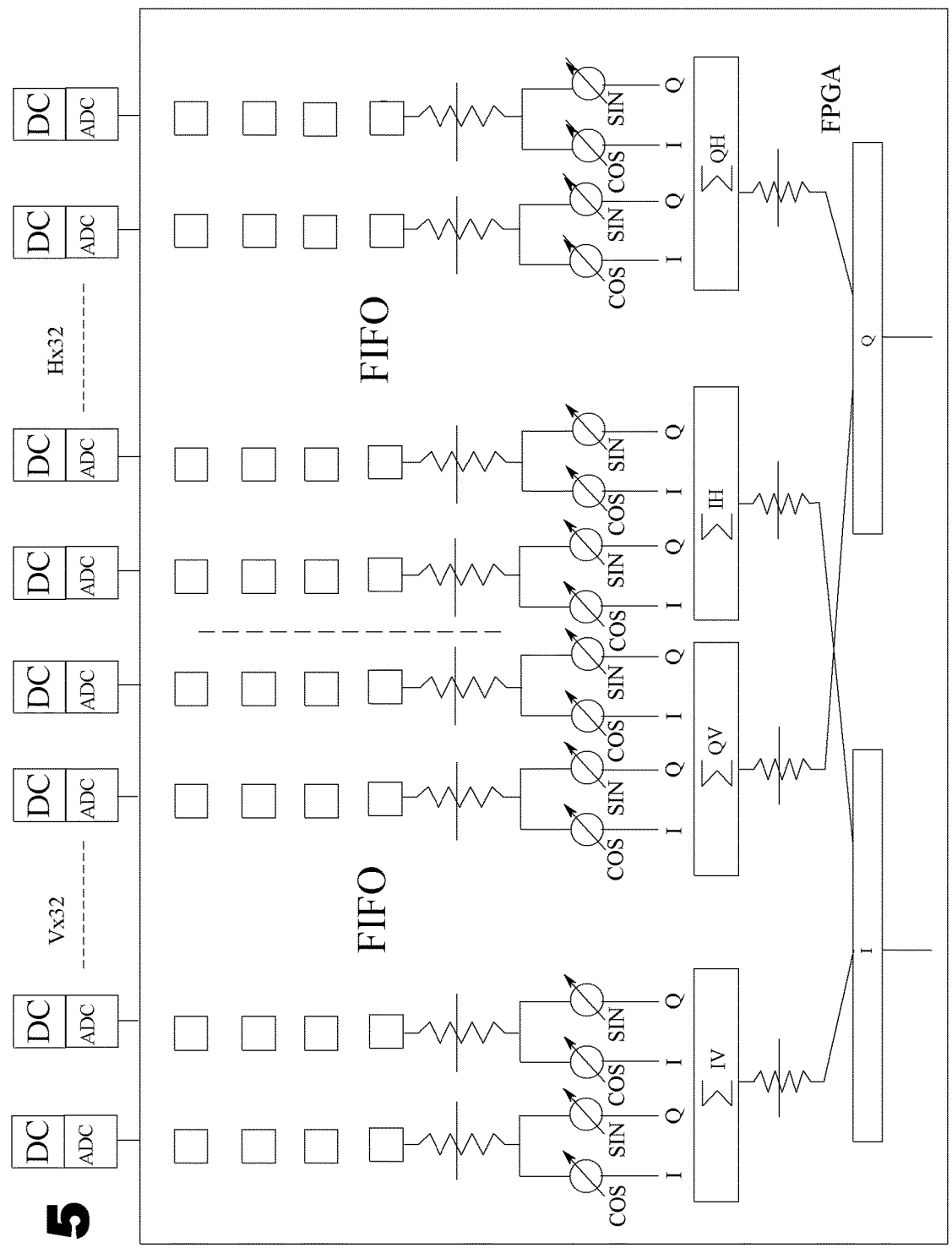
FIG. 5 is a block diagram of the Field-Programmable Gate Array (FPGA) circuit.

FIG. 5 shows a block diagram of an FPGA circuit configured for 32 elements (single row of a 32×32 array). FIG. 5 shows 64 separate inputs from the antenna for each row, 32 horizontal and 32 vertical. However, as will be later discussed, the particular antenna design that is part of the present invention, drastically reduces this load. It is possible to sum at least 8 elements at the antenna itself (on the antenna circuit board) to reduce the number of inputs to 8 for a given row (4 horizontal and 4 vertical). These can be further summed on or off the antenna board to reduce the number of inputs to 2 for each row. The example FPGA circuit of FIG. 5 will now be discussed in detail assuming the full 64 inputs (in this example only, the row summation is not performed on the antenna board itself).

RX Operation

The FPGA circuit in Fig. 5 processes a single row of 32 elements (there are 32 rows and hence 32 circuits like that shown in FIG. 5), (a single FPGA chip may contain several or many of these circuits; however, with an antenna of this size, it is generally necessary to use more than one FPGA).

The 64 analog Ku band or higher signals from the 32 vertical and 32 horizontal active antenna elements each pass through LNAs and are then down-converted to a manageable frequency which is sampled by 32 Analog-to-Digital Converters (ADCs) for vertical polarization and 32 ADCs for horizontal polarization. The samples flow to FPGA simultaneously and are typically inserted into First-in-First-Out (FIFO) buffers. Each stage of the FIFO buffers insert a one sample delay into the chain of samples. The 64 raw samples coming out of the FIFO buffers can be added to reference values pre-determined by calibration of the system to produce corrected samples. The reference values are stored in a flash memory and can be updated in subsequent calibration if, or when, necessary.

The FPGA then adjusts the amplitude of each corrected sample by multiplying it by a real number supplied by the DSP. It then multiplies each adjusted sample by phase adjusted digital cosine and sine functions of the correct frequency. This results in 64 complex numbers representing I and Q components of the 32 vertical samples and the 32 horizontal samples.

The amplitudes and phases across 32 rows (32 circuits as shown) cause the beam to steer vertically. The controller that maintains the beam scanning algorithm typically provides new common amplitude and phase values at a rate of around one update per mS to the FPGA to steer the beam in altitude. Next, the vertical I and Q samples, and the horizontal I and Q samples, are summed across the entire row of 32 to produce a single vertical I/Q sample pair (complex number) and a single horizontal I/Q sample pair (complex number).

Again, in various embodiments of the invention, the row summing process takes place on the antenna board before the signal reaches the LNA (in Rx or after the signal comes from the PA in Tx).

At this point, there are thus two complex numbers represented by four separate samples: Vertical I; Vertical Q, Horizontal I and Horizontal Q. An amplitude and phase adjustment is made to these two complex numbers (four samples) to set the correct polarization. Both amplitude and phase of the samples can be changed by information from the DSP. To change amplitude of a complex number, both I and Q are multiplied by a constant. To change phase, I and Q are changed with respect to each other.

The polarization correction combines the vertical and horizontal I samples and the vertical and horizontal Q samples. The result is a single I/Q sample pair is passed to the Modem as output.

Tx Operation

For transmit, the process is simply reversed. The DSP passes a single I/Q sample pair to the FPGA. It is split into a vertical I/Q pair and a horizontal I/Q pair with the proper amplitudes and phases for the desired polarization. These two complex numbers are then digitally multiplied by phase adjusted cosine and sine functions and then multiplied by a constant to adjust amplitude to determine the beam. This is done 32 times to produce the correct samples for the 32 horizontal antenna elements and the 32 vertical antenna elements in a row. The 64 output samples for a given row are processed by 64 digital to analog converters (DACs) to produce 64 analog RF signals. Each of these signals is upconverted to the transmit frequency and fed to a power amplifier (PA) and finally to the 32 vertical and 32 horizontal antenna elements in a row.

Embodiments of the present invention operate in Ku-band. Analog vertical and horizontal sum signals are down converted from Ku-band to Base Band and then up converted to L-Band in the receive mode, and are first down converted from L-band to Base Band and then up-converted from Base Band to Ku-band in the transmit mode. Other embodiments allow direct conversion to and from Ku-band or higher to and from L-band without passing through baseband.

As is known in the art, use of an antenna for both receive and transmit functions requires the use of diplexers. These diplexers are not shown in FIG. 5; however, they are assumed to be inserted between each active antenna element (or row) and the LNA/PA for that element (or row).

As stated, the above described operation of an FPGA circuit assumed that each antenna row needed 64 ADCs/DACs, upconverters, and LNA/PA pairs with diplexers. With the special antenna design of the present invention, it is possible to perform the row summing of at least 8 or more rows at the antenna itself. This considerably reduces the number of RF circuits and converters needed. Using an antenna capable of self-summing 8 horizontal and 8 vertical elements reduces the FPGA row input from 64 to 8, or in a general formulation: a N×N dual polarization antenna requires N processing chains for vertical and N processing chains for horizontal, instead of N squared for each one of the polarizations.

Figure 6:
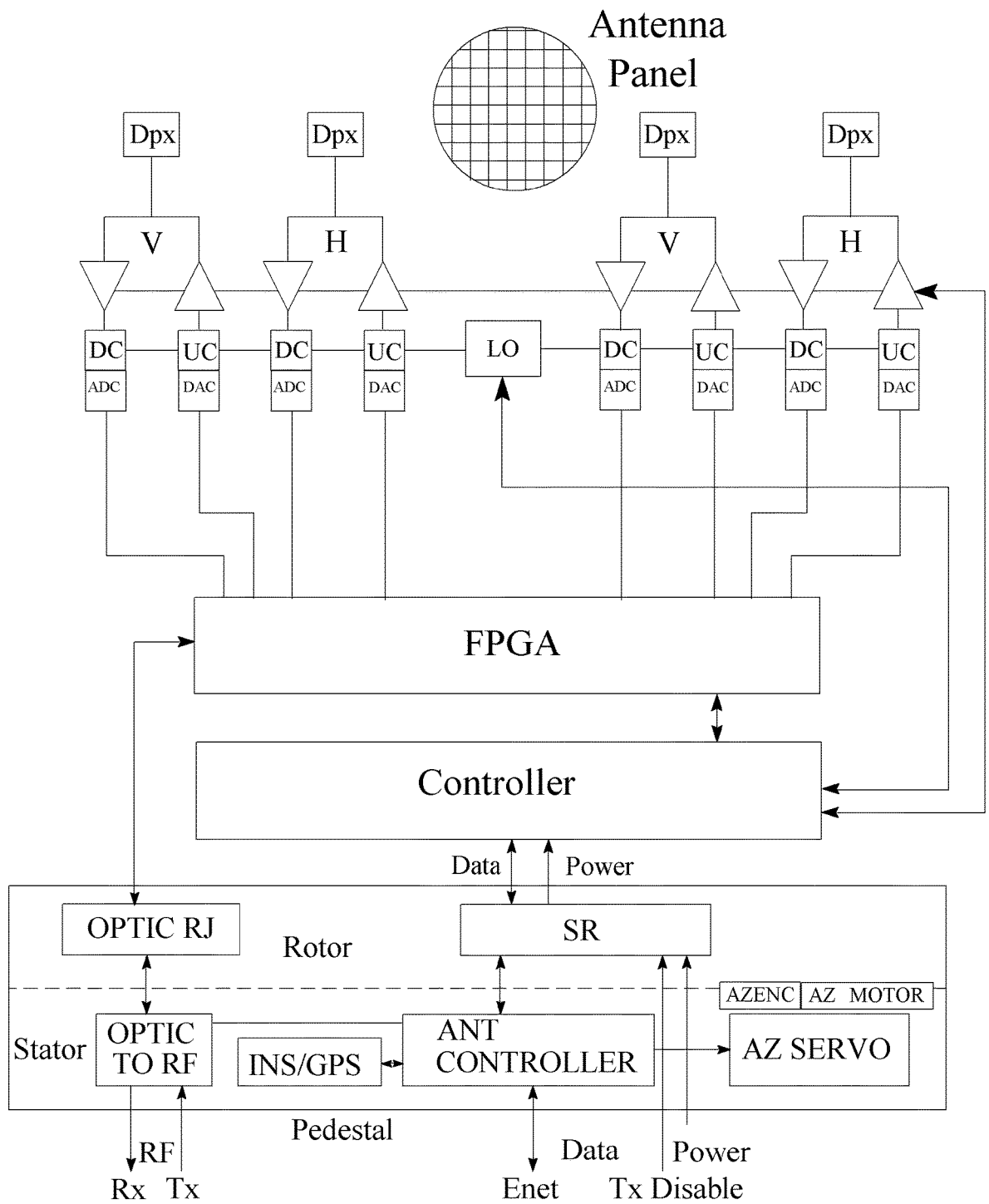
FIG. 6 is a block diagram of an embodiment of the present invention with mechanical horizontal scanning.

FIG. 6 shows a block diagram of a system embodiment of the present invention. The antenna array is shown at the top. Below that are rows of diplexers allowing the antenna to both receive and transmit. LNA/PA pairs on an RF board feed down-converters and/or up-converters as well as ADCs and/or DACs. A local oscillator (LO) feeds the up-/down-converters. At this point, the signal path becomes digital, and the digital signals are processed by one or more FPGAs. A DSP and/or other controller sets the polarization, and sends the amplitude/phase updates to the FPGA for scanning the beam vertically (or horizontally in some embodiments). The azimuth tracking is much slower and is controlled by a rotating pedestal that has a rotating part or rotator and a stationary part of stator. Receive and transmit I/Q data samples (or analog signals) are sent through a rotating joint (RJ) optically. The azimuth is typically commanded to an antenna controller digitally using a system like Ethernet (TM).

The antenna itself becomes a MODEM front-end which yields the ability to implement a modem within the antenna itself, or converting the digital samples back to Rx and Tx L-band signals (1-2 GHz) to support traditional and existing Modems.

Polarization Control

Antenna polarization is defined as the direction of the electromagnetic fields produced by the antenna as energy radiates away from it. An absolute polarization is determined by the angle between the antenna geometry and the earth coordinate system frame. A common practice in the art to control the antenna polarization is to tilt the antenna, or its feed, mechanically respectively to vertical line of the local earth frame.

Figure 15:
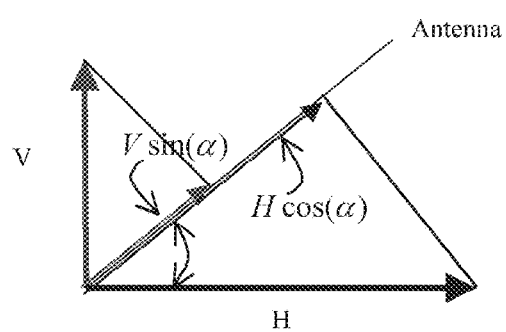
FIG. 15 is a vector diagram polarization based on horizontal and vertical signals.

The antenna of the present invention is a dual polarization antenna, which is fed by two ports that are perpendicular one to another—A vertical port and a horizontal port. By power balance between these ports, any polarization angle can be achieved, as if the antenna was tilted mechanically, as shown in FIG. 15 where a is the polarization angle. The total power of the signal is therefore $S=(V\sin(\alpha)+H\cos(\alpha))^2$ In satellite communication there are two common polarizations that are used: linear and circular.

In linear polarization, the phase between the horizontal and the vertical ports is zero, and the polarization angle is given by: $\alpha=\mathrm{Tan}^{-1}(V/H)$, where V and H represent the power at each one of the antenna ports. In circular polarization the power of the horizontal and the vertical port is identical and the phase between them could be positive 90 degrees or negative 90 degrees which defines if whether the polarization is RHCP—Right Hand Circular polarization or LHCP—Left hand circular polarization. The desired polarization type is determined by the satellite polarization type, according to the network configuration—circular RHCP, circular LHCP, linear V or linear H. The polarization is calculated according to the satellite position and the terminal position and attitude.

Since computations for the antenna of the present invention are performed digitally, any power balance or phase difference between the components is computed easily by complex multiplication of each one of the ports. According to this multiplication, the correct phase and amplitude is achieved to achieve the desired polarization. The process is done continuously, since terminal position and attitude is updated frequently. The polarization can be switched very rapidly between any of the types—linear V, Linear H, RHCP or LHCP.

Tracking Algorithm

The antenna system of the present invention is designed to be a mobile system, which continuously calculates the direction to satellite by knowing the terminal position and attitude to the satellite position.

The tracking is done by two levels:

Level 1—Pointing Algorithm

The terminal position and attitude data are provided by a GPS/INS system as an integral part of the terminal. The pointing algorithm calculates the antenna angles geometrically to point at the satellite—azimuth, elevation and polarization using navigation data supplied by the network.

In the case of a GSO (Geo Stationary) satellite, its location is fixed and is provided by the network (via the Modem). In a LEO (Low Earth Orbit) satellite, the satellite position changes rapidly, and must be calculated continuously. Furthermore, the time that the satellite is seen from the terminal's location on the earth is short (from the satellite's sunrise to its sunset). The terminal must also consider the same data for the next satellite location, and so on in order to switch satellites at an appropriate time.

The method used to calculate the satellite coordinates (latitude and longitude) is based on SGP4 model which uses a form of the Kepler equations using TLE (Two Line Element) sets. Data regarding the satellite mechanics is updated continuously and provided by the network/satellite operator.

The model predicts the effect of perturbations caused by the Earth's shape, drag, radiation, and gravitation effects from other bodies such as the sun and moon.

Level 2—Electromagnetic Lock

In addition, because the antenna of the present invention samples the satellite's signal, it has the ability to assess the signal power strength, and according to that determine the squint from its boresight, and make the necessary adjustments.

In azimuth, where the rotation mechanism is mechanical, the system initiates a linear scan algorithm—it creates a periodical small perturbation, and measure the signal variation, then calculates the squint angle to adjust. In elevation, where the system is electronically steered, it uses a sigma-delta algorithm: $\Sigma$ is the summation of power from all radiators, and $\Delta$ is the difference between the summation of the first half of all radiators' power to the second half. The ratio: $\Delta/\Sigma$ is proportional to the squint angle form the boresight; it is then calculated and adjusted accordingly.

On top of that there is a synchronization with the modem status, which assures that the system is locked on the correct signal.

Modularity he antenna of the present invention, as mentioned above includes a mechanism for steering and polarization that is done as a digital process. The output of the system is a stream of bits that is manipulated in order to achieve beam forming and polarization control. Due to that fact, multiple antennas can be installed on the same platform, and all data streams are directed to a master antenna which combines them all together into a one unified system after their locations has been calibrated. The unification of similar system is simply the same operation as the beam forming due to the fact that the process is digital.

Multi-Beam

The antenna of the present invention, as previously discussed, performs beam forming in elevation using a digital process. The beam-forming by itself is a complex multiplication by a specific phase of every channel and then summation of all channels. This arithmetic is performed digitally by the help of the FPGA, and theoretically can be replicated to infinity, but practically is limited to FPGA computation power, and to the maximum data rate that can be transferred. With reasonable computation power in the FPGA, it is feasible to create several beams, that operate independently and contain different data streams.

The system includes four major modules:

1. Antenna panel which is an array of magneto-electric elements. The panel contains the printed elements array, the network printed circuit board and a diplexer bank which is an RF Tx to Rx filter bank per each row.

2. Active RF layer—contains all RF LNAs, PAs, down/up converters and synthesizers.

3 Digital layer—contains the FPGA and DSP which controls the antenna electronic steering.

4. Antenna Positioner—contains:

a. Azimuth axis pedestal b. Antenna controller which responsible for tracking algorithm, and external interfaces.

c. Azimuth axis Motor servo system.

d. MEMS based INS/GPS.

e. Optical Rotary joint and Copper Slip Ring.

f. Optic to RF transceiver.

As discussed, the present invention supports both Rx and Tx on the same aperture; therefore, an array of diplexers is required in item 1 of the above list; one diplexer per row, and per horizontal and vertical arm.

Optical Rotary Joint

The antenna of the present invention, as described before, supports data streams of least data tens of Gigabits per second. The system also supports multibeam capability and unification of several systems, which increases the data rate even more. This leads to a solution using fiber optic technology, and since the antenna is rotating in azimuth axis, an optical rotary joint or other means of transferring data across a rotating system, integrated in the system in order to successfully transfer the optical data stream.

Design of Row-Summing Enhanced Symmetry Magneto-Electric (ME) Antenna

It is known that a well-designed ME element has a wide bandwidth with a high rotationally symmetrical pattern, high cross-polarization rejection and high isolation between ports.

Figure 7A:
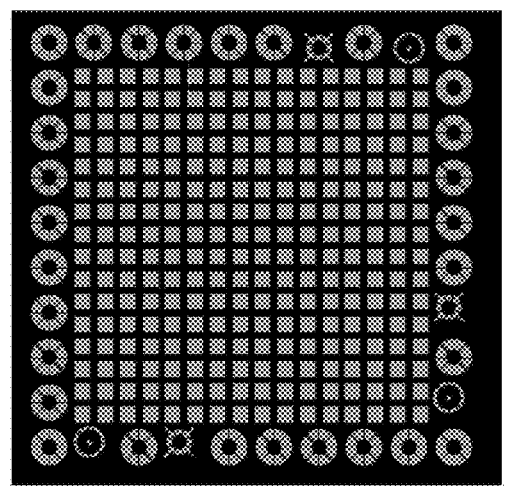
FIGS. 7A-7B show an 8×8 antenna board pattern.
Figure 7B:
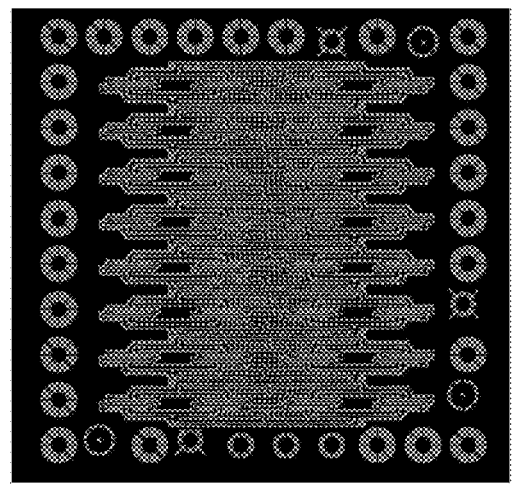

One embodiment of the present invention is an 8×8 magneto-electric antenna or antenna segment that provides in-row summing across 8 columns. This results in only two feed points per row (one for the horizontal active elements in the row, and one for the vertical active elements in the row. The entire antenna has thus only sixteen signal feeds from the RF circuitry. FIGS. 7A-7B show top and bottom of an embodiment of the 8×8 antenna.

Figure 8:
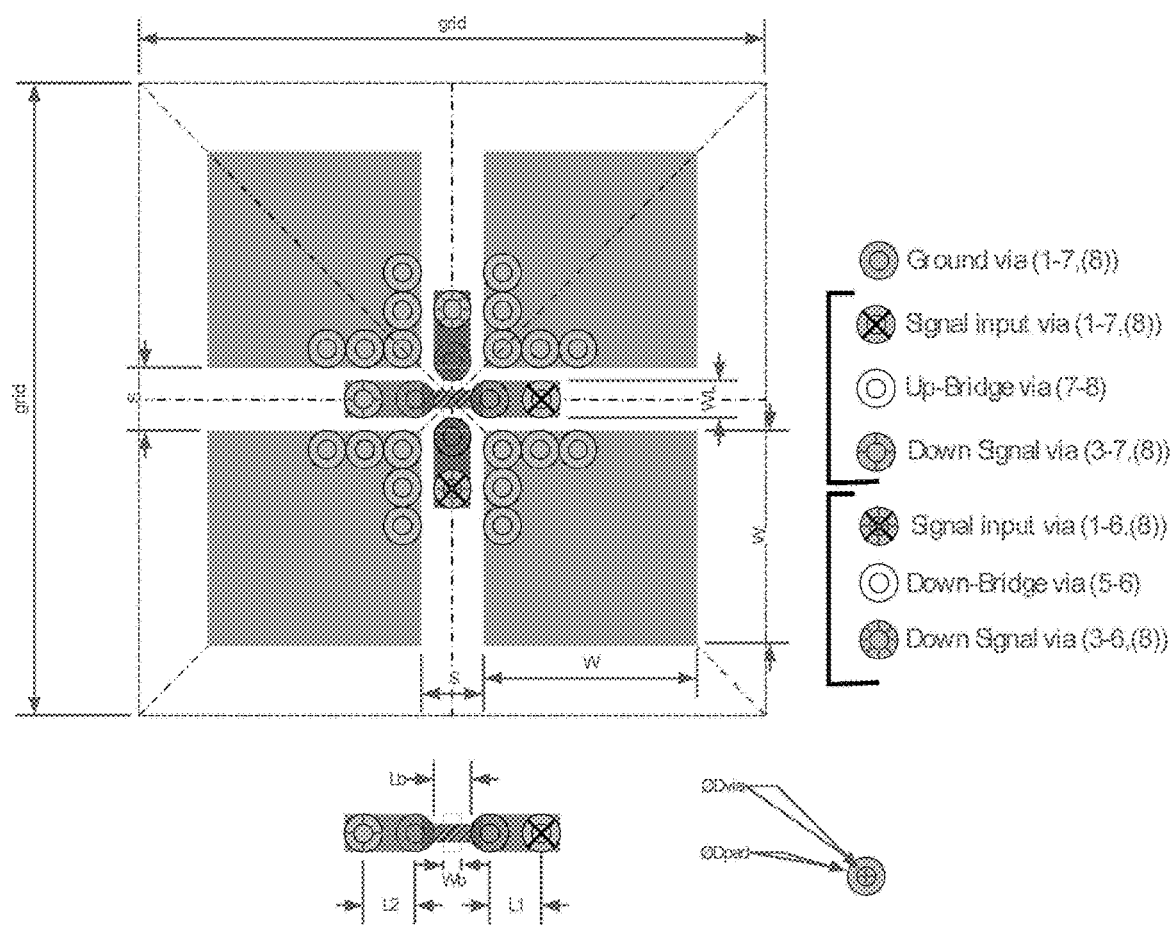
FIG. 8 shows an embodiment of an 8×8 antenna.

FIG. 8 shows a top plan view of a first embodiment of this antenna: Two active elements form a cross in the center of FIG. 8. One is the horizontal element, and the other is the vertical element. Four ground planes flank the two active elements.

Figure 9:
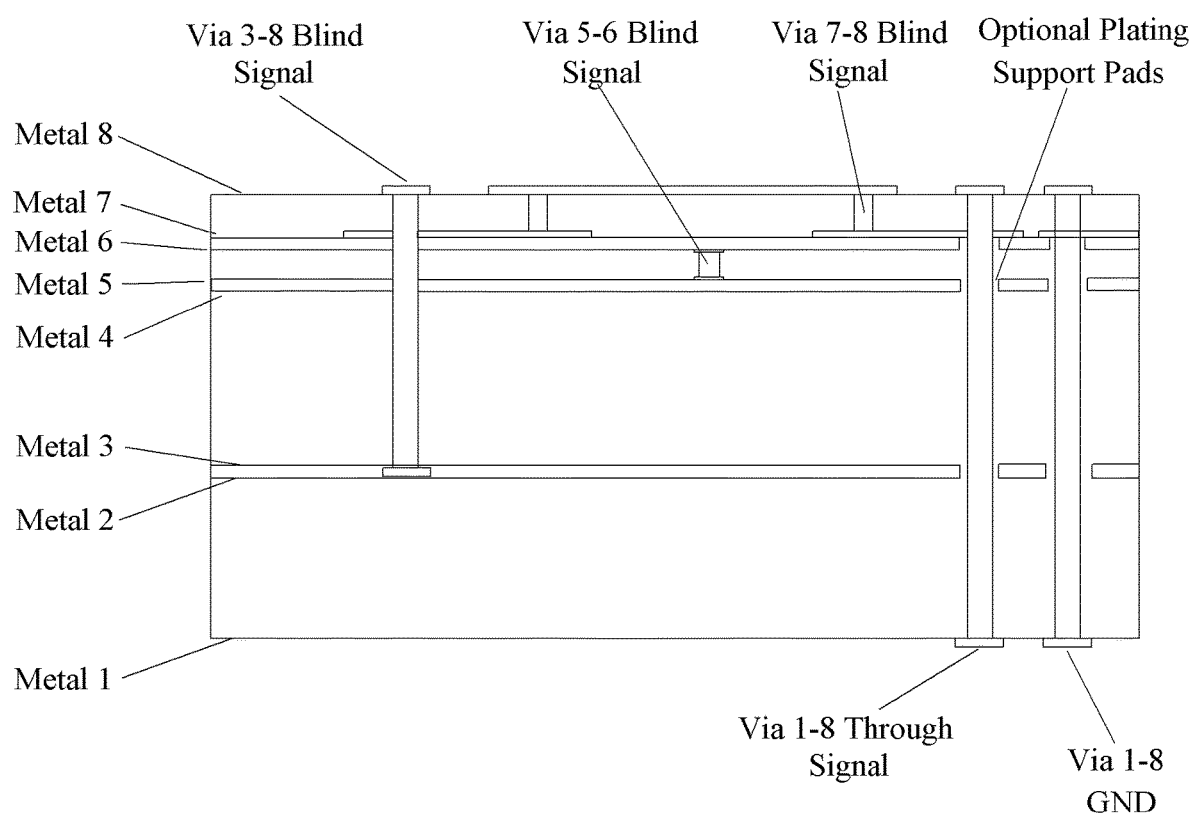
FIG. 9 shows a cross section of the printed circuit board of FIG. 8.

The initial layers and via structure and order of manufacturing is depicted in the FIG. 9. Design rules relating non-micro via are: minimum diameter (0.3 mm), via-pad diameter ($D_{via}$+0.3 mm), via-via spacing (0.6 mm edge to edge), via length to diameter (12:1).

The problem in design of FIGS. 8-9 arises because the two elements need to cross over one-another without making any direct electrical contact between them. The cross-over area between the active elements disturbs the perfect symmetry of the array and adds capacitive coupling between horizontal and vertical ports.

While, this embodiment is a workable solution to the bridge problem, a drawback is the added complexity and cost of the design and implementation, while exposing the circuit to possible additional asymmetry due to registration tolerances between printed areas and vias.

Figure 13:
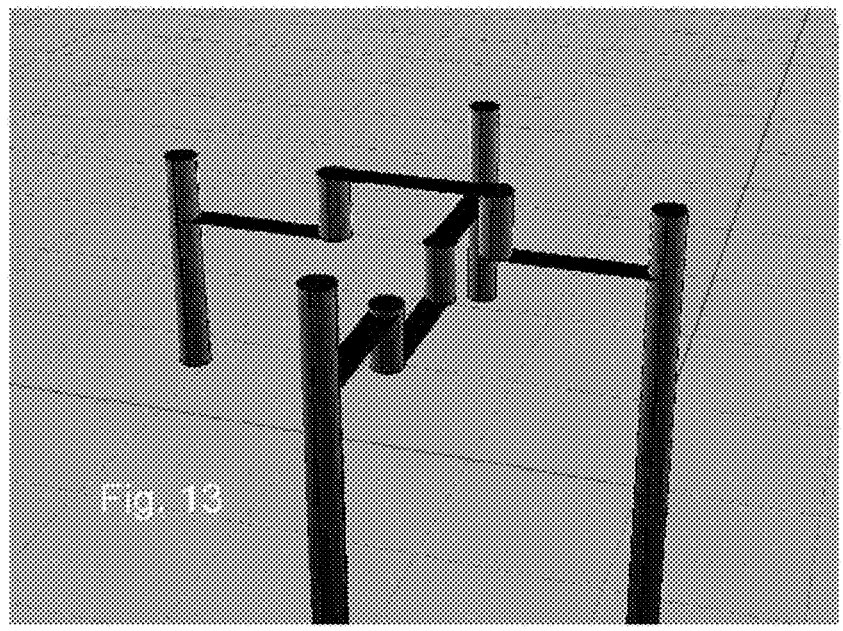
FIG. 13 shows a diagram of the no-bridge embodiment.

The chosen solution utilizes a narrow upward bridge at one element, and a narrow downward bridge at the other element A depiction of this arrangement is shown in FIG. 13. This leaves most of the structure of the two elements electromagnetically symmetric, adding almost same discontinuities, and reducing the capacitance between the elements due to enlarging the distance between them and narrowing the overlapping area. It can be seen in FIG. 13, that the center regions of the horizontal and vertical active elements cross over one-another with an upper bridge and a lower bridge. This arrangement achieves optimum symmetry between the two polarizations with minimum capacitive coupling between them.

Figure 10:
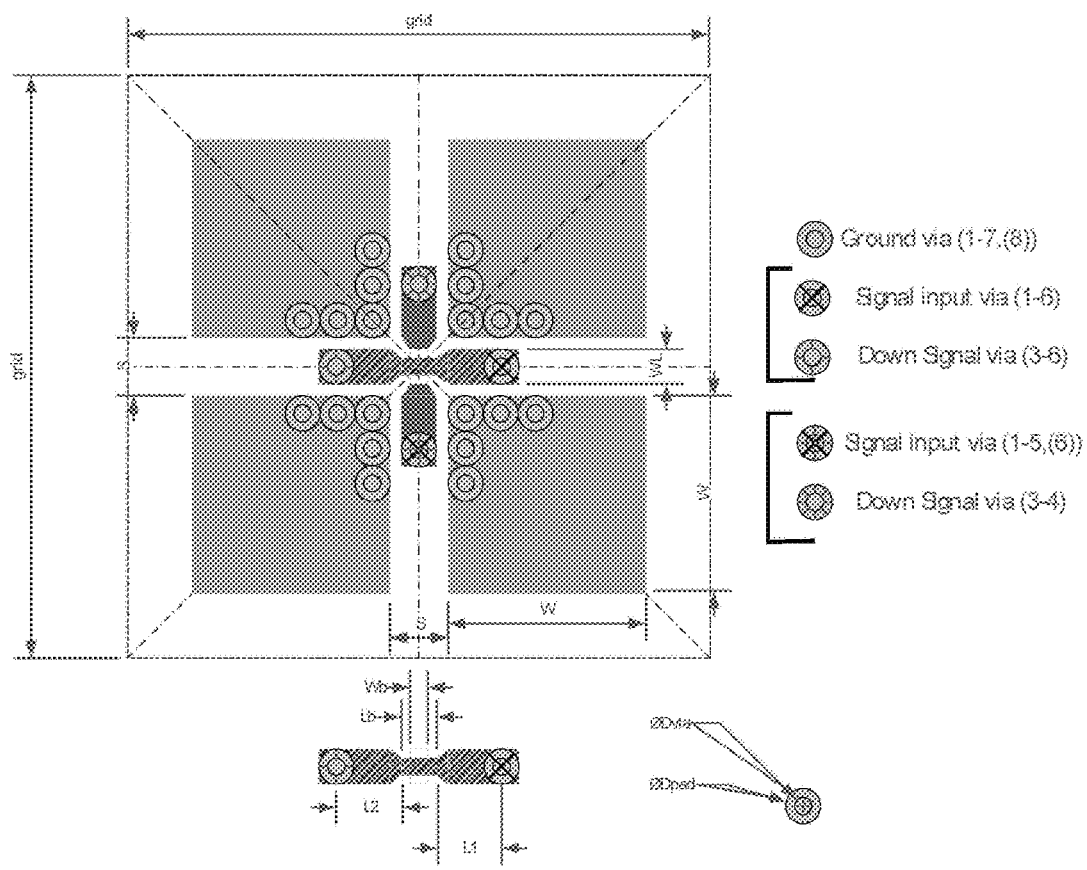
FIG. 10 shows a no-bridge embodiment of an 8×8 antenna.
Figure 11:
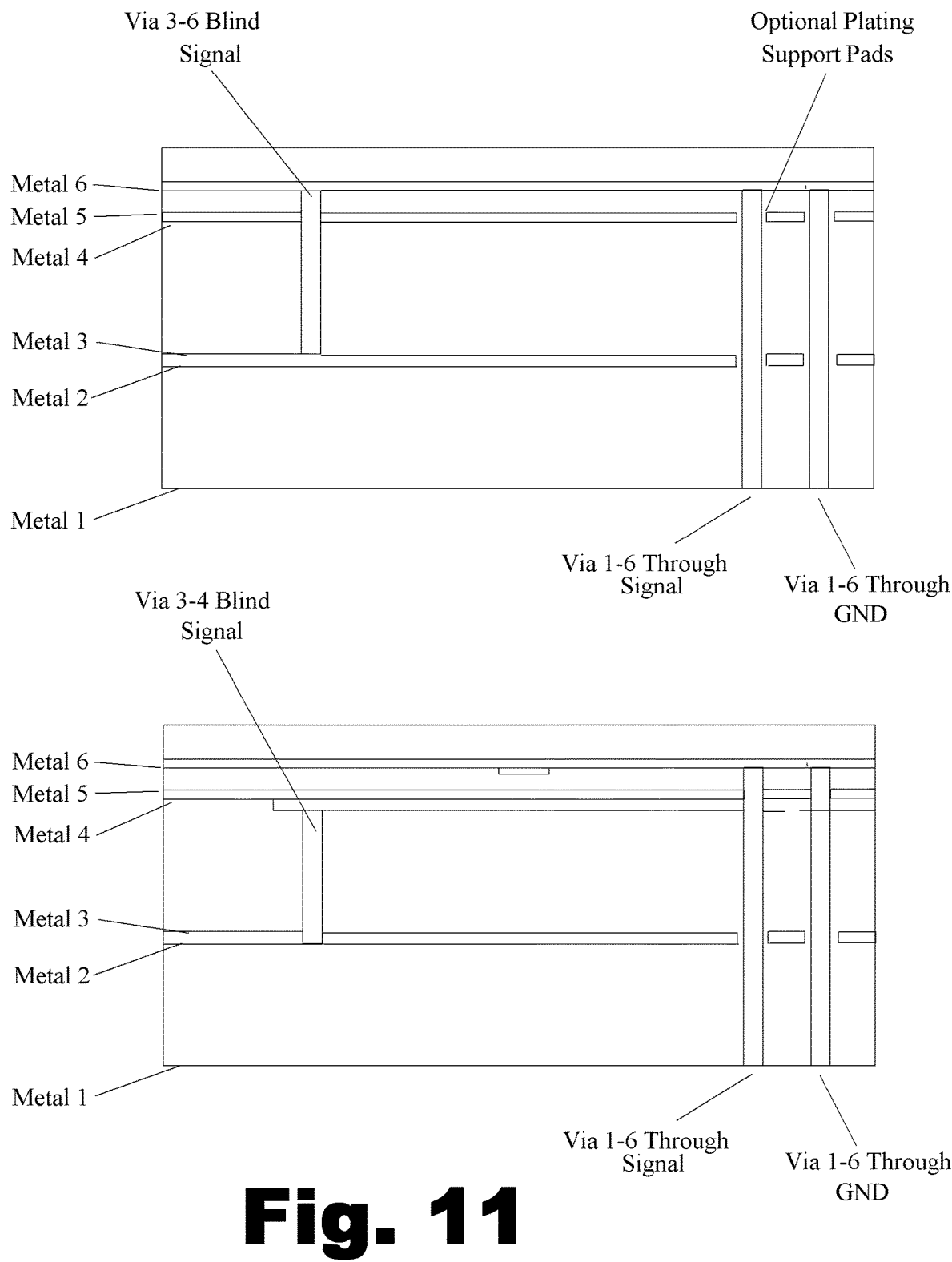
FIG. 11 shows two embodiments of cross sections of the printed circuit board for the antenna of FIG. 10.

The alternate embodiment shown in top plan view in FIG. 10, and side view cross-sections in FIG. 11, eliminates the bridge; one element can be made higher than the other, resulting in a slight asymmetry between the two polarizations. The larger the distance between elements—the less symmetry, but the lower the capacitance, hence better the isolation. Even though this embodiment results in less symmetry and more capacitance between the polarizations, it is a workable, manufacturable solution.

To provide a better compromise, the top element can be half immersed in dielectric and half in air, while the bottom element is fully immersed in dielectric for manufacture. A 10 mil dielectric layer is then put on top of the structure. This layer is fused as the last step enclosing both elements in dielectric. Since this layer does not have any metal or vias, it serves as an integral radome. A 10 mil separation between layers with an overlapping line width of 0.2 mm works (though 0.1 mm lines are technologically viable, they may cause manufacturing problems).

Figure 12:
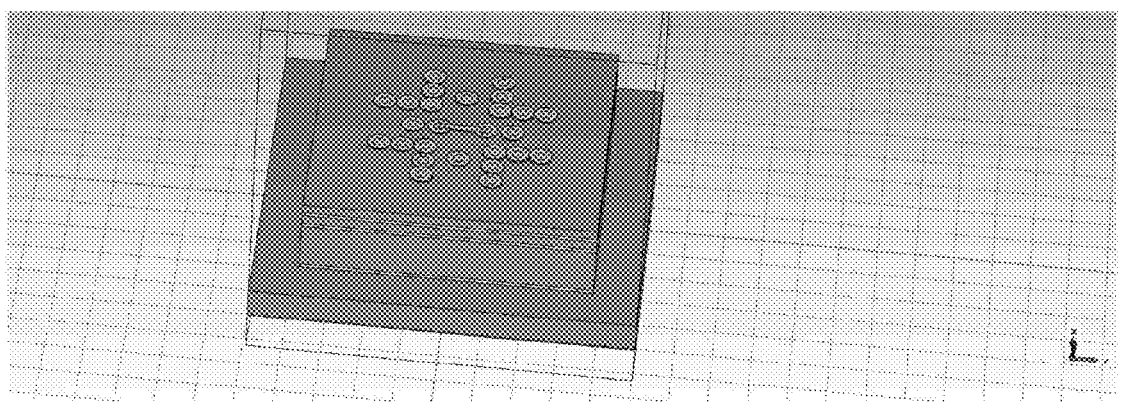
FIG. 12 shows an isometric view of the top of the element showing the milling.

Surface waves are eliminated by milling all layers except the lowest layer, by 0.2 mm from the edge of the petals leaving a 2.4 mm air gap between the active elements. This is shown in FIG. 12.

Symmetricity Enhanced Dual-Polarized Element

In summary:

1. The element utilizes both magnetic current and electric current for enhanced bandwidth and symmetrically of radiation pattern of both orthogonal polarizations.

2. Symmetry between polarization is enhanced through an antipodal bridge structure located at the central overlapping region of the feed.

3. The antipodal bridge is designed to reduce the capacitive coupling between the feeds, thus improving considerably the isolation between the orthogonal polarization networks.

4. A multi-layer successive blind and buried vias technology is used to provide the electric-mechanical environment essential for implementation of the bridge and internal walls at extremely high frequencies. This is not possible with a purely mechanical structure.

Splitter/Combiner

The present invention sums signals along rows. For the basic 8×8 array of elements described above, a printed 8->1 splitter/combiner can be fabricated using printed circuit board (PCB) design rules such as "deep via" technology. The "deep via" technology enables production of blind vias after bonding the layers. The basic design rule is that the depth of the via should not exceed its diameter (1:1), such that air bubbles do not stick-in and prohibit the plating solution from penetration. Because it is necessary to pin ground to ground in the strip line structure, up-vias are interleaved with down-vias with an intermediate ground layer connecting the vias together. Pads are also provided within this intermediate ground around each via. An embodiment of an 8->1 splitter/combiner is shown in FIG. 14.

Unified Design

Figure 14:
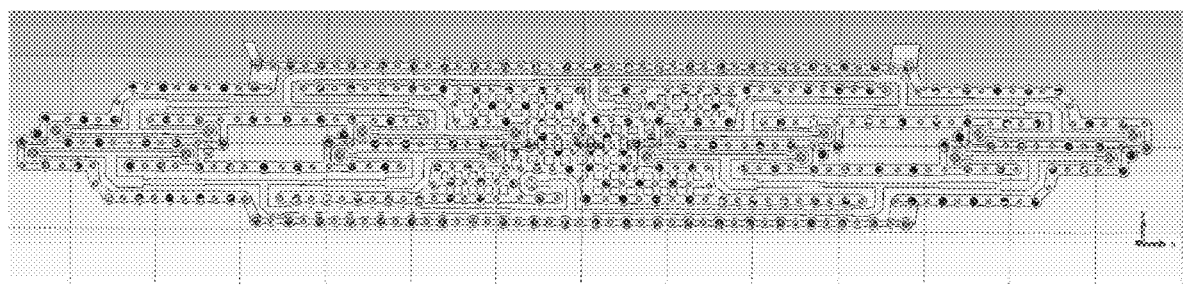
FIG. 14 shows a plan view of an 8 to 1 splitter/combiner.

The final implantation of any size array is a single stackup, including a dual polarization array on a single PCB approximately 4 mm thick, with printed elements of the structure of FIGS. 10-11 above combined with the printed double combining/splitting networks of FIG. 14. which sums up each row of elements (separately for vertical and horizontal polarization) at the antenna to a single port. FIGS. 7A-7B show top and bottom of the 8×8 array.

The unique feature of row summing coupled with the other design features of the present invention leads to a complete satellite phased array antenna system that scans electronically in the vertical and rotates mechanically to track in azimuth.

Integrated Dual-Polarized Phased-Array Row Antenna

Summary
1. A Unique magneto-electric bridge structure
2. A diplexer bank that supports common aperture Tx and Rx.
3. A method for integration of two 8:1 wideband stripline power dividers/combiners within half a wavelength unit cell.
4. The network is integrated within the PCB stack with the antenna as a single unit.
5. The network does not require external components.
6. The network has an extremely low insertion loss.
7. The network includes both vertical and horizontal polarization sub-networks. The sub-networks are inherently phased matched both internally and between the two sub-networks
8. The two sub-networks are isolated from each other using an intermediate ground layer with staggered up/down vias, and by utilizing deep-via technology to facilitate single board implementation of antenna and network.
9. The signals are sampled and/or synthesized using a high sampling rate, while maintaining dense RF channels, and dense high-speed digital lines. Embodiments of the present invention work with 500 Msamples/s with 10 bits of sampling which yield 5 Gbits/s per channel.

A non uniform transmission line method imitating uniform sections of transmission lines is another technique unique to the present invention, facilitating squeezing two 8:1 power splitter/combiner networks a very limited space of ($\lambda/2$ for both), while achieving the aforementioned characteristics. The non-uniform transmission line sections match the impedance of each of the active elements to the input impedance of the input ports of the splitter/combiner while maintaining equal delay and phase. Examples of these non-uniform transmission lines can be seen in FIG. 14. To fabricate larger arrays such as 32×32, multiple 8 element sections may be used, or a single 32 element row fabricated in a similar manner to that of the 8×8 examples given.

Several descriptions and illustrations have been presented to aid in understanding the present invention. One with skill in the art will realize that numerous changes and variations may be made without departing from the spirit of the invention. Each of these changes and variations is within the scope of the present invention.

The invention claimed is:

1. A satellite communication system comprising:
a row-summing transmit-receive phased array antenna including an N×N array of active elements with N rows and N columns, where N is a positive integer; each active element having a horizontally polarized sub-element and a vertically polarized sub-element;
each of the N rows having a vertical row summation circuit configured to a form or deliver a single analog vertical sum signal across the N vertically polarized sub-elements of the row, wherein, all of the N vertically polarized sub-elements are in phase with one-another, and a horizontal row summation circuit configured to form or deliver a single analog horizontal sum signal across the N horizontally polarized sub-elements of the row wherein, all of the N horizontally polarized sub-elements are in phase with one-another;
the analog vertical and horizontal sum signals each being converted from analog to digital with an analog to digital converter (ADC) to produce digital vertical and digital horizontal sum signals in a receive mode; the digital vertical and horizontal sum signals each being converted from digital to analog with a digital to analog converter (DAC) to produce analog vertical and horizontal sum signals in a transmit mode;
the digital vertical and horizontal sum signals each connected to digital amplitude and phase changing circuits, wherein, both horizontal and vertical amplitude and phase is determined for each row of the N rows upon command from a processor;
wherein, said digital amplitude and phase-delay changing circuits determine both a beam elevation scan angle and a beam polarization; and
said N×N array being mounted on a rotatable mechanical pedestal with a changeable angular position constructed to determine an azmuthal tracking angle.

2. The satellite communication system of claim 1 constructed to operate in Ku-band, Ka-band or V-band.

3. The satellite communication system of claim 1, wherein said N×N array is mounted on a printed circuit board (PCB), and said vertical summation circuit and said horizontal summation circuit are both on the PCB.

4. The satellite communication system of claim 1, wherein the vertical sub-element and the horizontal sub-element are elongated of equal length.

5. The satellite communication system of claim 4, wherein the vertical sub-element is perpendicular to the horizontal sub-element.

6. The satellite communication system of claim 5, wherein the vertical sub-element and horizontal sub-element each have a center region and two ends; each center region having a center point equidistant from the two ends, the center point of the vertical sub-element being co-located with the center point of the horizontal sub-element, the vertical sub-element being electrically isolated from the horizontal sub-element.

7. The satellite communication system of claim 6, wherein the center regions of the vertical and horizontal sub-elements form a pair of bridges with one of the bridges non-conductively crossing over the other of the bridges.

8. The satellite communication system of claim 6, wherein the center regions of the vertical and horizontal sub-elements are offset from one-another with one above the other.

9. The satellite communication system of claim 1, wherein pedestal rotation commands are transmitted from a processor to a motor control system on the pedestal via fiber optics and at least one optical rotary joint.

10. The satellite communication system of claim 1 constructed to operate in Ku-band, wherein said analog vertical and horizontal sum signals are down converted from Ku-band to Base Band and then up converted to L-Band in the receive mode, and are first down converted from L-band to Base Band and then up-converted from Base Band to Ku-band in the transmit mode.

11. The satellite communication system of claim 3, further comprising both a vertical and a horizontal splitter/combiner on said PCB.

12. The satellite communication system of claim 1, wherein said digital amplitude and phase changing circuits are in one or more field-programmable gate arrays (FPGA).

* * * * *